No. 697,180. Patented Apr. 8, 1902.
C. D. SMITH.
VENTILATOR FOR CHIMNEYS.
(Application filed Apr. 15, 1901.)
(No Model.)
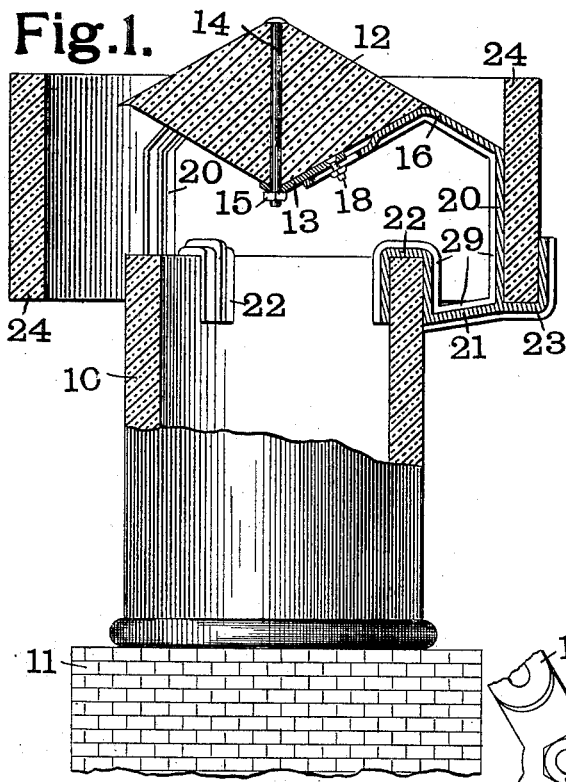
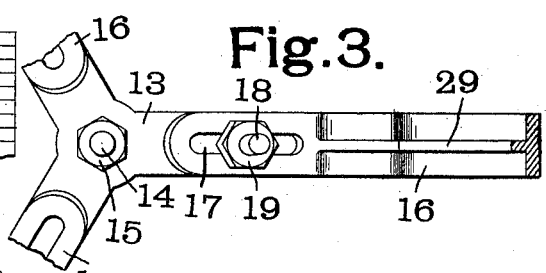
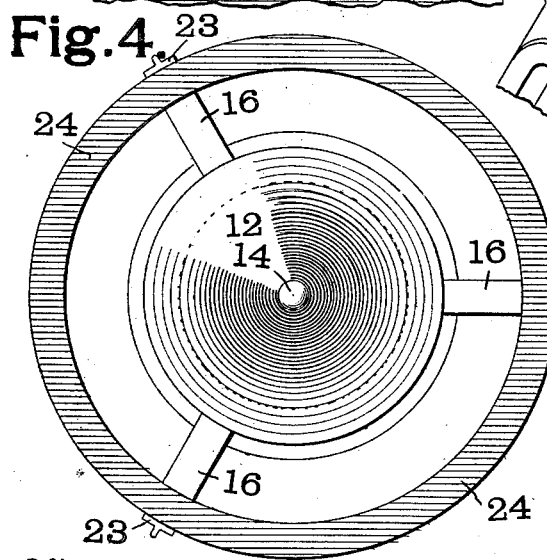
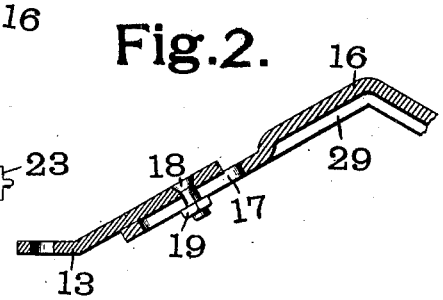
Witnesses
W. A. Alexander
J. R. Watkins
Inventor
C. D. Smith
By Attorneys

UNITED STATES PATENT OFFICE.

CHARLES D. SMITH, OF ST. LOUIS, MISSOURI.

VENTILATOR FOR CHIMNEYS.

SPECIFICATION forming part of Letters Patent No. 697,180, dated April 8, 1902.

Application filed April 15, 1901. Serial No. 55,881. (No model.)

*To all whom it may concern:*

Be it known that I, CHARLES D. SMITH, a citizen of the United States, residing at the city of St. Louis, in the State of Missouri, have invented a certain new and useful Ventilator for Chimneys, of which the following is such a full, clear, and exact description as will enable any one skilled in the art to which it appertains to make and use the same, reference being had to the accompanying drawings, forming part of this specification.

The object of my invention is to provide a ventilator for chimneys or other flues which will be simple of construction and adjustable to flues of different sizes and which at the same time will effectually prevent the entrance of rain or snow into the flue.

My invention consists in certain novel features and details of construction, all of which are described in the following specification and pointed out in the claims affixed hereto.

In the accompanying drawings, which illustrate a form of ventilator made in accordance with my invention, Figure 1 is a view, partly in section and partly in elevation, of my improved ventilator and the chimney to which the same is attached. Fig. 2 is an enlarged section of a portion of the hanger. Fig. 3 is a bottom plan view, on an enlarged scale, of a portion of the hanger; and Fig. 4 is a top plan view of the part shown in Fig. 1.

Like marks of reference refer to similar parts in the several views of the drawings.

10 represents a tile or chimney-pot carried by a brick chimney 11.

12 is a double cone of tiling or other suitable fireproof material. The cone 12 is secured to a spider 13 by means of a bolt 14 and nut 15. Adjustably secured to the spider 15 are bent arms 16, preferably three in number. Each of the arms 16 is provided with a slot 17, through which passes a bolt 18 carried by the spider 13. Each of the bolts 18, is provided with a nut 19. Each of the arms 16 is provided with a downward extension 20, having an inward-projecting portion 21, terminating adjacent to the chimney-pot 10. Carried by the inward extension 21 is a U-shaped bracket 22, adapted to embrace the top of the chimney-pot 10, and thus support the ventilator. Each of the downward projections 20 is provided with an L-shaped bracket 23, adapted to receive the sleeve 24, of tiling or other fireproof material.

In order to adjust the ventilator to chimneys of different sizes, it is only necessary to loosen the nuts 19, when the arms 16 can be adjusted radially to bring the brackets 22 in position to fit over the edges of the chimney. It will be necessary to use different sizes of sleeves for different sizes of chimneys. The cone 12 and the supporting parts, however, will be the same for the various sizes, and hence it will only be necessary for the dealer to carry assorted sizes of sleeves, all the cones and supporting parts being the same. The weight of the cone 12 and sleeve 24 is sufficient to hold the parts in place without the use of bolts or rivets, and hence the ventilator can be detached from the chimney to give access to the same for cleaning simply by lifting the parts from the top of the chimney-pot.

It will be seen that my ventilator is very simple of construction and can be readily adjusted to chimneys of varying size. The construction of the ventilator is such that the chimney is completely protected from rain or snow by the cone 12 or 25 and that no matter in what direction the wind may be blowing it is prevented from entering the chimney by the combined action of the cone and sleeve.

I wish it understood that where in the specification and claims I have used the word "cone" I wish to include a pyramid, as a pyramid will have the same effect as a cone. In case a pyramid is used the sleeve in place of being annular will be of a shape corresponding with the base of the pyramid.

Having fully described my invention, what I claim as new, and desire to secure by Letters Patent of the United States, is—

1. The combination with a cone, of a plurality of radial arms adjustably secured to said cone, brackets carried by said arms for engaging with the top of a chimney, and brackets carried by said arms, and a sleeve removably supported by said brackets.

2. The combination with a cone, of a spider secured to said cone, a plurality of radially-adjustable arms attached to said spider, brackets carried by said arms for engaging with the top of a chimney, and brackets carried by said arms for supporting a sleeve.

3. The combination with a cone, of a spider secured to the under face thereof, a plurality of radial arms adjustably attached to said spider, downward extensions on said arms, outwardly-projecting brackets on said downward extensions for supporting a sleeve, and inwardly-projecting brackets also on said downward extensions for engaging with the top of a chimney.

4. In a chimney-ventilator, the combination with a plurality of arms, of a set of brackets carried by said arms for removably securing the same to the top of a chimney, a second set of brackets also carried by said arms, a sleeve removably supported by said second set of brackets, and a cone supported by said arms.

In testimony whereof I have hereunto set my hand and affixed my seal in the presence of the two subscribing witnesses.

CHARLES D. SMITH. [L. S.]

Witnesses:
JAMES H. BRYSON,
W. A. ALEXANDER.